(12) United States Patent
Maes et al.

(10) Patent No.: US 8,688,816 B2
(45) Date of Patent: Apr. 1, 2014

(54) HIGH AVAILABILITY BY LETTING APPLICATION SESSION PROCESSING OCCUR INDEPENDENT OF PROTOCOL SERVERS

(75) Inventors: Stephane H. Maes, Fremont, CA (US); Terje Strand, San Francisco, CA (US); Induprakas Kodukula, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 416 days.

(21) Appl. No.: 12/948,063

(22) Filed: Nov. 17, 2010

(65) Prior Publication Data
US 2011/0314165 A1 Dec. 22, 2011

Related U.S. Application Data

(60) Provisional application No. 61/262,789, filed on Nov. 19, 2009.

(51) Int. Cl.
*G06F 15/173* (2006.01)

(52) U.S. Cl.
USPC .......................... 709/223; 709/203; 709/217

(58) Field of Classification Search
USPC .................. 709/223, 224, 203, 217, 219, 229
See application file for complete search history.

(56) References Cited

U.S. PATENT DOCUMENTS

| | | | |
|---|---|---|---|
| 6,446,144 B1 * | 9/2002 | Habusha et al. ................ 710/29 |
| 7,023,800 B1 | 4/2006 | McAuley et al. | |
| 7,627,671 B1 | 12/2009 | Palma et al. | |
| 7,657,657 B2 * | 2/2010 | Rao et al. ...................... 709/248 |
| 7,797,565 B1 * | 9/2010 | Tran et al. ...................... 714/4.1 |
| 7,870,265 B2 | 1/2011 | Kramer et al. | |
| 7,940,650 B1 * | 5/2011 | Sandhir et al. ................ 370/219 |
| 8,001,250 B2 * | 8/2011 | Langen et al. ................ 709/227 |
| 8,042,000 B2 * | 10/2011 | Birch et al. ...................... 714/32 |
| 8,095,688 B2 | 1/2012 | Maes | |
| 8,103,759 B2 * | 1/2012 | Langley et al. ................ 709/223 |
| 8,103,782 B2 * | 1/2012 | Elleuch et al. ................ 709/228 |
| 8,161,168 B2 | 4/2012 | Lankford et al. | |
| 8,250,234 B2 * | 8/2012 | Allen et al. .................... 709/236 |
| 8,285,873 B2 * | 10/2012 | Scott et al. ..................... 709/242 |
| 2004/0186918 A1 * | 9/2004 | Lonnfors et al. ............... 709/250 |

(Continued)

OTHER PUBLICATIONS

U.S. Appl. No. 11/670,150, filed Feb. 1, 2007, Notice of Allowance mailed Sep. 6, 2011, 15 pages.

(Continued)

*Primary Examiner* — Lashonda Jacobs
(74) *Attorney, Agent, or Firm* — Kilpatrick Townsend & Stockton LLP

(57) ABSTRACT

Embodiments of the invention provide systems and methods for providing high availability in a session supporting multiple protocols. More specifically, embodiments of the present invention provide for high availability processing by decoupling an application session from protocol processing. That is, protocol processing can be performed at protocol nodes specific to each protocol session. The protocol nodes can then pass messages to and from a session node that performs session processing other than the protocol processing. The session of the first session node can be replicated on a second session node and, upon a failure of the first session node, control of the session can be passed to the second session node. The session can then be continued on the second session node according to a number of different models described herein.

21 Claims, 16 Drawing Sheets

(56) References Cited

U.S. PATENT DOCUMENTS

| | | | |
|---|---|---|---|
| 2005/0021670 A1 | 1/2005 | Maes | |
| 2005/0044188 A1* | 2/2005 | Nakazawa et al. | 709/219 |
| 2005/0091362 A1* | 4/2005 | Shigeta et al. | 709/223 |
| 2005/0097367 A1* | 5/2005 | Nakazawa et al. | 713/201 |
| 2005/0125768 A1 | 6/2005 | Wong et al. | |
| 2005/0138002 A1* | 6/2005 | Giacobbe et al. | 707/3 |
| 2005/0203962 A1* | 9/2005 | Zhou et al. | 707/200 |
| 2005/0213607 A1* | 9/2005 | Cashman et al. | 370/467 |
| 2005/0246445 A1* | 11/2005 | Panasyuk et al. | 709/227 |
| 2006/0026290 A1* | 2/2006 | Pulito et al. | 709/227 |
| 2006/0090097 A1* | 4/2006 | Ngan et al. | 714/6 |
| 2006/0153068 A1 | 7/2006 | Dally et al. | |
| 2006/0168053 A1* | 7/2006 | Greata et al. | 709/206 |
| 2006/0271812 A1* | 11/2006 | Horton et al. | 714/4 |
| 2006/0271813 A1* | 11/2006 | Horton et al. | 714/4 |
| 2007/0005973 A1* | 1/2007 | Mynam et al. | 713/171 |
| 2007/0204017 A1 | 8/2007 | Maes | |
| 2007/0208862 A1* | 9/2007 | Fox et al. | 709/227 |
| 2007/0220302 A1* | 9/2007 | Cline et al. | 714/4 |
| 2007/0268922 A1 | 11/2007 | Dougan et al. | |
| 2008/0077705 A1 | 3/2008 | Li et al. | |
| 2008/0120599 A1 | 5/2008 | I'Anson | |
| 2008/0186845 A1 | 8/2008 | Maes | |
| 2008/0270614 A1* | 10/2008 | Stumpert et al. | 709/227 |
| 2009/0030986 A1 | 1/2009 | Bates | |
| 2009/0040923 A1* | 2/2009 | Bantukul et al. | 370/230 |
| 2009/0222506 A1 | 9/2009 | Jeffery et al. | |
| 2009/0222842 A1 | 9/2009 | Narayanan et al. | |
| 2010/0318616 A1* | 12/2010 | Langley et al. | 709/206 |
| 2011/0113247 A1* | 5/2011 | Panasyuk et al. | 713/168 |
| 2011/0131318 A1 | 6/2011 | Maes | |
| 2012/0011207 A1* | 1/2012 | Morris | 709/206 |
| 2012/0034941 A1* | 2/2012 | Sendrowicz | 455/507 |

OTHER PUBLICATIONS

Bossche et al., "J2EE-based Middleware for Low Latency Service Enabling Platforms", IEEE Globecon 2006 Global Telecommunications Conference, Dec. 1, 2006, 7 pages.

Lim et al., JAIN SLEE 1.0 Specification, Jan. 30, 2004, https://cds.sun.com/is-bin/INTERSHOP.efinity/WFS/CDS-CDS_JCP-Site/en_US/-/USD/ViewFilteredProducts-SimpleBundleDownload, 299 pages.

Open Mobile Alliance, "OMA Service Environment", Mar. 8, 2005, 35 pages.

Sun Microsystems, "A SLEE for All Seasons", Mar. 4, 2003, 15 pages.

Sun Microsystems, "JAIN and Java in Communications", Mar. 2004, 14 pages.

Sun Microsystems, "JAIN: Integrated Network API's for the Java Platform", Nov. 2000, 23 pages.

Sun Microsystems, JAIN and Open Networks, Aug. 2003, 8 pages.

Sun Microsystems, JAIN Technology: Serving the Developer Community, Jul. 28, 2004, http://web.archive.org/web20040728172200/http://java.sun.com/products/jain/jain0503.pdf, 69 pages.

U.S. Appl. No. 11/670,150, filed Feb. 1, 2007, Office Action mailed May 25, 2010, 17 pages.

U.S. Appl. No. 11/670,150, filed Feb. 1, 2007, Final Office Action mailed Jan. 11, 2011, 20 pages.

U.S. Appl. No. 11/670,150, filed Feb. 1, 2007, Advisory Action mailed Mar. 30, 2011, 2 pages.

U.S. Appl. No. 12/786,725, filed May 25, 2010, Non-final Office Action mailed May 1, 2013, 13 pages.

U.S. Appl. No. 12/786,725, filed May 25, 2010, Final Office Action mailed Sep. 23, 2013, 16 pages.

U.S. Appl. No. 12/786,725, filed May 25, 2010, Advisory Action mailed Dec. 4, 2013, 3 pages.

\* cited by examiner

HIGH AVAILABILITY BY LETTING APPLICATION SESSION PROCESSING OCCUR INDEPENDENT OF PROTOCOL SERVERS

CROSS-REFERENCES TO RELATED APPLICATIONS

The present application claims benefit under 35 USC 119(e) of U.S. Provisional Application No. 61/262,789, filed on Nov. 19, 2009 by Maes et al. and entitled "High Availability by Letting Application Session Processing Occur Independent of Protocol Servers," of which the entire disclosure is incorporated herein by reference for all purposes.

BACKGROUND OF THE INVENTION

Embodiments of the present invention relate generally to methods and systems for providing high availability processes and more particularly to providing high availability by decoupling an application session from processing of a supporting protocol.

High availability of a process such as an application supporting a communication session is achieved by replicating the session between nodes of a cluster so that if one node fails or otherwise becomes unavailable, another node or set of nodes can take over support of that session. An example of such replication is the group processing provided by JGroups technology toolkit in JEE middleware. In this and other systems, the session and application level data is replicated on multiple nodes of a cluster using different strategies, e.g., reliable multicast etc, unicast, and different replications (one-to-two, one-to-n, etc.). Upon failure of the node supporting the session detected via different means like hardware failure detection or middleware monitoring (e.g. via heart beat), the session is switched to one of the other nodes on which the session is replicated, e.g., network resources are informed of the failure and switch to the other nodes. Since the session, including the application level data, is replicated on the other node, the session can be rebuilt and resumed on the other node. This is often referred to as service/application availability in that as soon as a failure occurs, the service or application is again available for new transactions, sessions, calls, etc. Another approach to providing high availability is demonstrated in Oracle Coherence that uses a distributed cache that can replicate sessions in a replica of the cache in a grid computing environment (i.e. set of nodes). Technologies such as JGroups or Oracle Coherence thus provide high availability for a session supporting a particular protocol.

When multiple protocols are involved in a particular session, the protocol messages are sent from one node to another. For example, protocol specific load balancers or routers and other protocol specific mechanisms can send the protocol messages to a node supporting the session in that protocol, i.e., which processes the protocol messages and supports the session. This first node is in turn replicated on a second node of the protocol. Upon failure of the first node, the session can be recovered on the second node which is replicating the session. So for example, following failure of the first node and a load balancing action in one of the protocols (e.g., Hypertext Transfer Protocol (HTTP)), the traffic of this first protocol may be sent to a new node since the load balancer or router is informed of the failure. However, the traffic of the other protocol (e.g., Session Initiation Protocol (SIP)) is not modified and not aware of what may have happened on the HTTP side if only HTTP was affected. In case of a hardware failure, it may be aware of the failure but may be sent to a different machine from where the HTTP load balancer decides to send the HTTP traffic. Therefore, the SIP traffic will continue to go to the first node or to another one, not the same as the one where the traffic for the first protocol was redirected. If the first node has since recovered, the SIP traffic will be processed by the now recovered first node even though the HTTP traffic is now being processed by the second node. All these variations can lead to a stalemate or "ping-pong" effect in the sessions where the session data is brought back to where the latest protocol message arrived and if these are different machines, the sessions go back and forth. Hence, there is a need for improved methods and systems for improved high availability processing.

BRIEF SUMMARY OF THE INVENTION

Embodiments of the invention provide systems and methods for providing high availability in a session by decoupling an application session from processing of a supporting protocol. According to one embodiment, a method of providing high availability in a communication session can comprise executing a first application session on at least one processing node and executing a first protocol session on the at least one processing node. The first protocol session can perform protocol processing specific to a supporting communications protocol and the application session can perform processing of the communication session other than protocol processing and wherein the first protocol session is de-coupled from the first application session. Incoming messages can be provided to the first application session from the first protocol session based on the protocol processing and outgoing messages to the first protocol session can be provided from the first application session based on the processing of the communication session.

A second protocol session can be executed on the at least one processing node, the second protocol session replicating the first protocol session. Upon detecting a failure of the first protocol session, the communication session can be continued with the first application session and the second protocol session. For example, continuing the communication session can comprise redirecting the outgoing messages from the first application session to the second protocol session. Alternatively, continuing the communication session can comprise moving the first application session to a node of the at least one processing node on which the second protocol session is executing. In yet another alternative, continuing the communication session can comprise determining a relative cost of redirecting the incoming and outgoing messages and moving the first application session to another node of the at least one processing node and either the outgoing messages from the first application session to the second protocol session or moving the first application session to the node on which the second protocol session is executed based on the relative costs. For example, the relative costs can be determined based on one or more of delays, bandwidth, and processing.

Additionally or alternatively, a second application session can be executed on the at least one processing node. The first application session can be replicated in the second application session. Upon a failure of the first application session, the second application session can be made an active session. For example, incoming messages from the first protocol session can be redirected to the second application session. Alternatively, the second application session can be moved to a node of the at least on nodes on which the first protocol session is executing. In yet another alternative, a relative cost of redirecting the incoming and outgoing messages and moving the second application session to a node on which the first protocol session is executed can be determined and either the incoming and outgoing messages can be redirected to the second application session or the second application session can be moved to the node on which the first protocol session is executed based on the relative costs. For example, the relative costs can be determined based on one or more of delays, bandwidth, and processing.

DETAILED DESCRIPTION OF THE INVENTION

Figure 1:
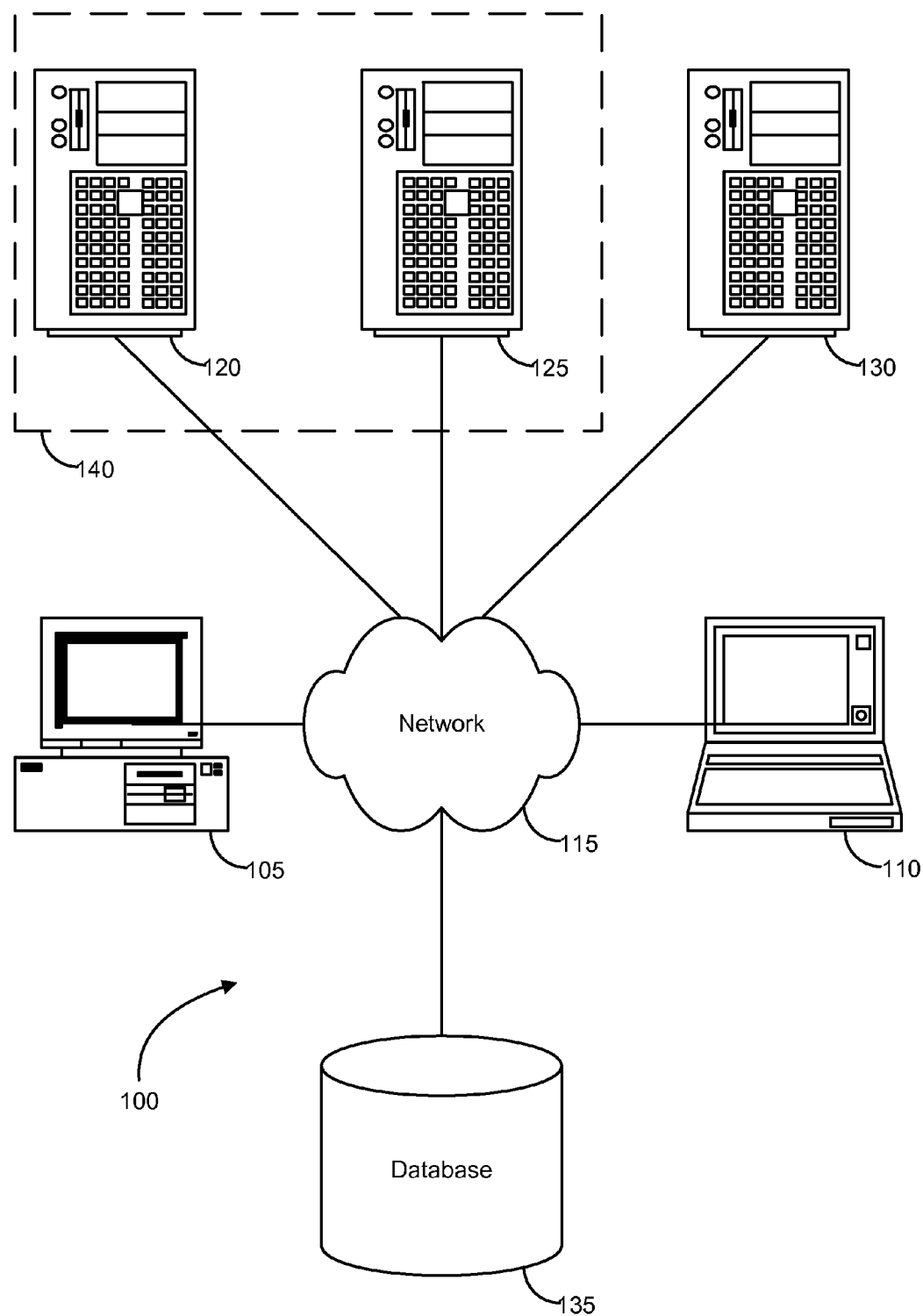
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In describing embodiments of the invention, reference is sometimes made to other terms having specific intended meanings. For example, as used herein, the term "protocol session" refers to data and processing associated with a specific communication protocol or protocol exchanges. The term "application session" refers to data and application processing associated with one or more protocol sessions and performing processing other than the protocol specific processing. However, in some cases, the application session may in fact perform some protocol processing such as deciding to send a specific protocol message based on application logic of the application session, e.g., sending a notification message. An application session can combine multiple protocol sessions as one bundle or may be separately handle different protocol sessions (e.g. an application that coordinates via Java or Web Service (WS) a SIP servlet application (SIP session) and HTTP servlet application.) A "communication session" refers to a combined one or more application sessions and the associated protocol sessions. However, it should be understood that these sessions, i.e., the application session and protocol session, can be implemented in different ways but can be treated separately in terms of behavior at execution.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for providing high availability in a communication session. More specifically, embodiments of the present invention provide for high availability processing by decoupling an application session from protocol processing. That is, high availability can be provided by performing protocol processing such as receiving, routing, and/or respond to, messages in one or more protocols supporting the communication session at protocol session(s) specific to that protocol. The protocol specific session(s) can then pass messages to and from an application session that performs session processing other than the protocol processing, e.g., beginning and/or ending the session, handling media of the session, interacting with user or other backend logic (e.g., accessing a user profile, billing, and/or other functions), etc.

The application session(s), protocol session(s), or both can be replicated as known in the art. For example, replication can be done by synchronization, broadcast from one to others, unicasts, multicasts, etc. Furthermore, replication can be in any number of nodes and/or can comprise replicating partial sessions across multiple nodes. Upon a failure of a replicated application session or protocol session, the corresponding replicated sessions can be made active. The communication session can then be continued according to a number of different models described herein. For example, in a first model, messages to the failed session, either a failed protocol session or application session can be redirected to the currently active session. In a second model, the currently active session can be moved to another node, e.g., an active application session can be moved to a node supporting a corresponding protocol session. In yet another model, a hybrid approach can be taken in which either the first model, i.e., redirecting messages to the active session, or the second model, i.e., moving the active session, is selected. In this hybrid model, determining which approach to take can be based, for example, on a relative cost (e.g., in terms of processing or other resource costs) of each. Additionally, it should be understood that, when moving an active session to another node, either a protocol session or an application session may be moved. Which session to move can be determined, for example, based on application logic, a pre-configuration, and/or other dynamic and/or pre-determined factors. For example, traffic and node usage at a given point may be used to determine which session is moved. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
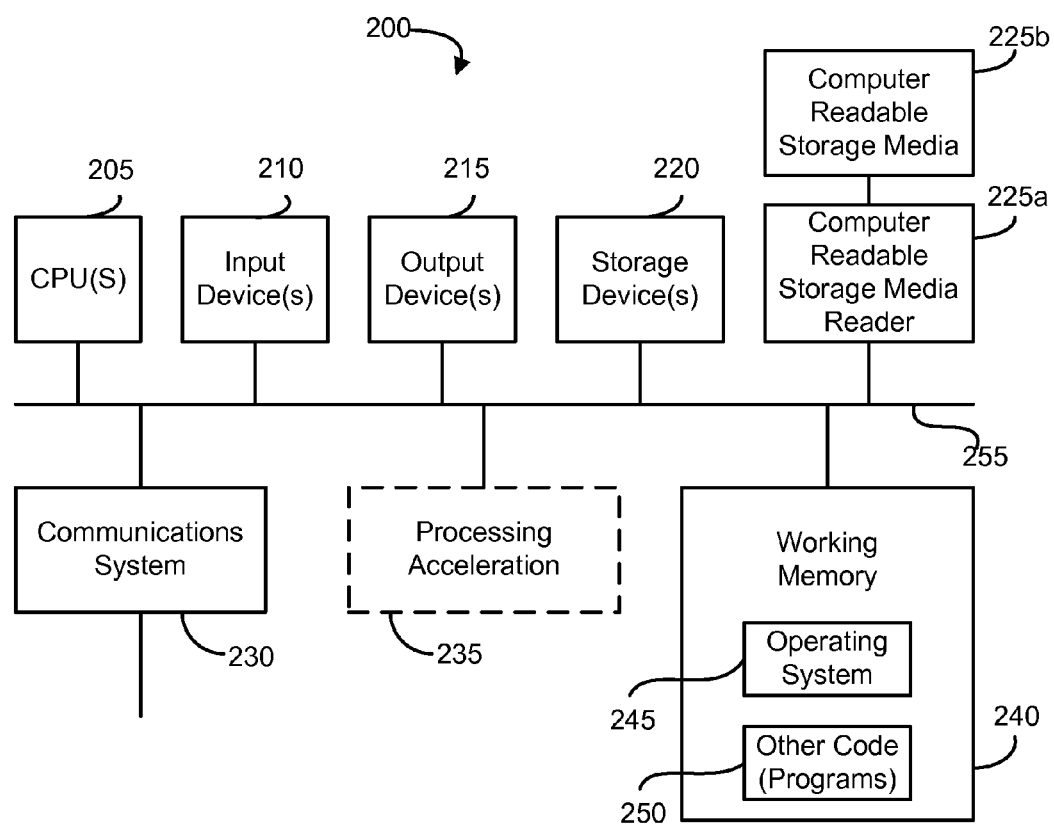
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3A:
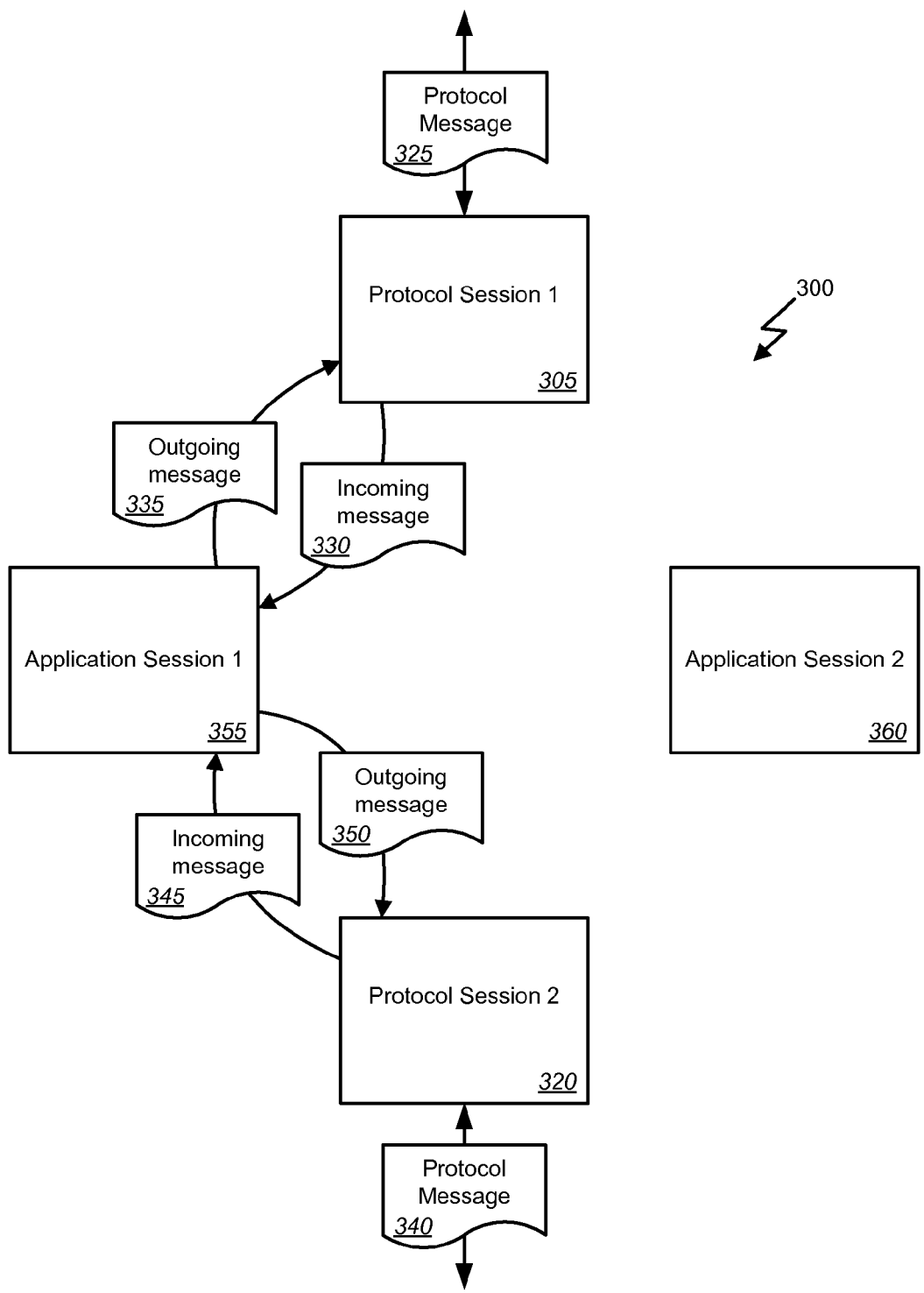
FIGS. 3A-3C are block diagrams conceptually illustrating providing high availability in a session according to one embodiment of the present invention.
Figure 3B:
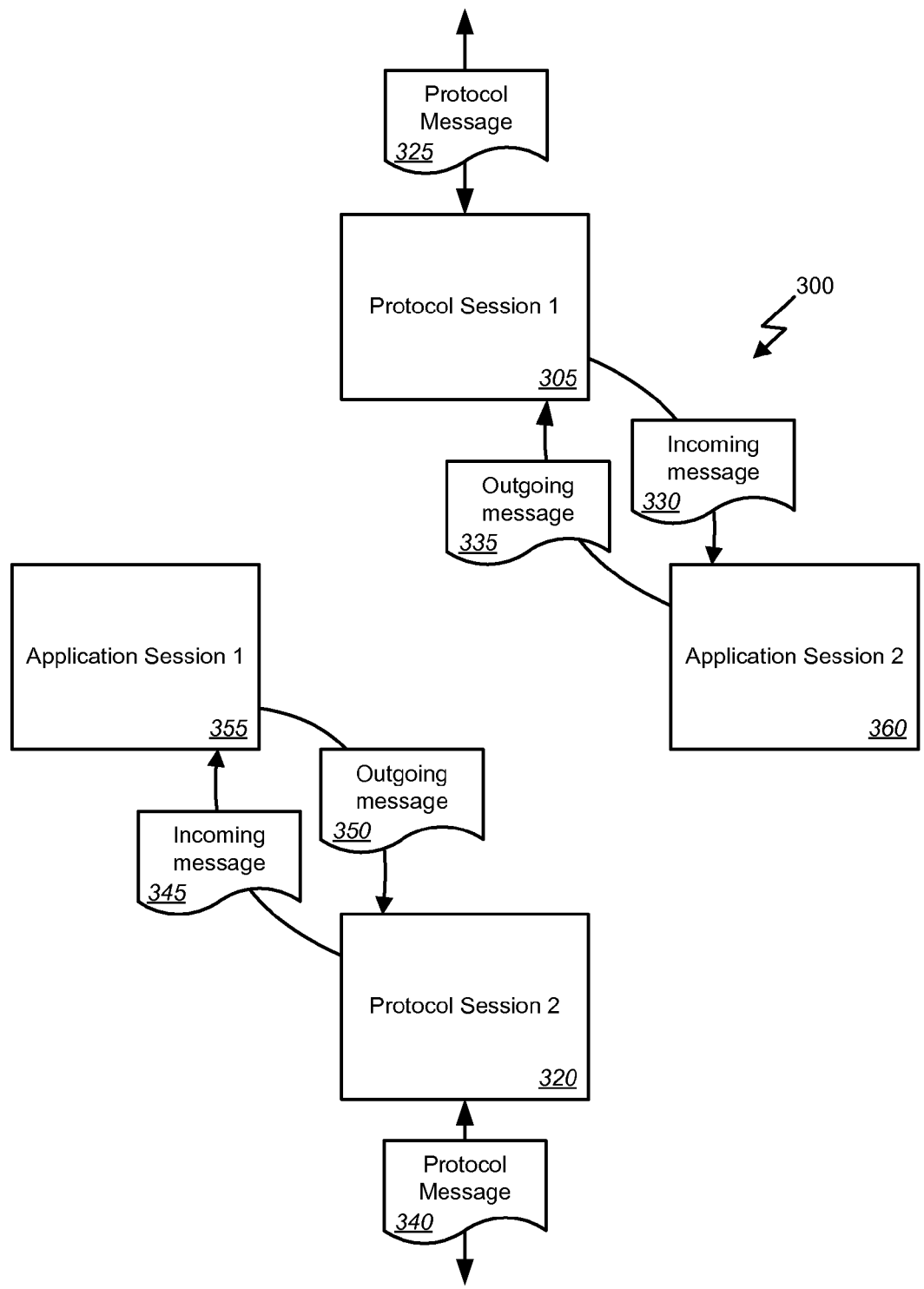
Figure 3C:
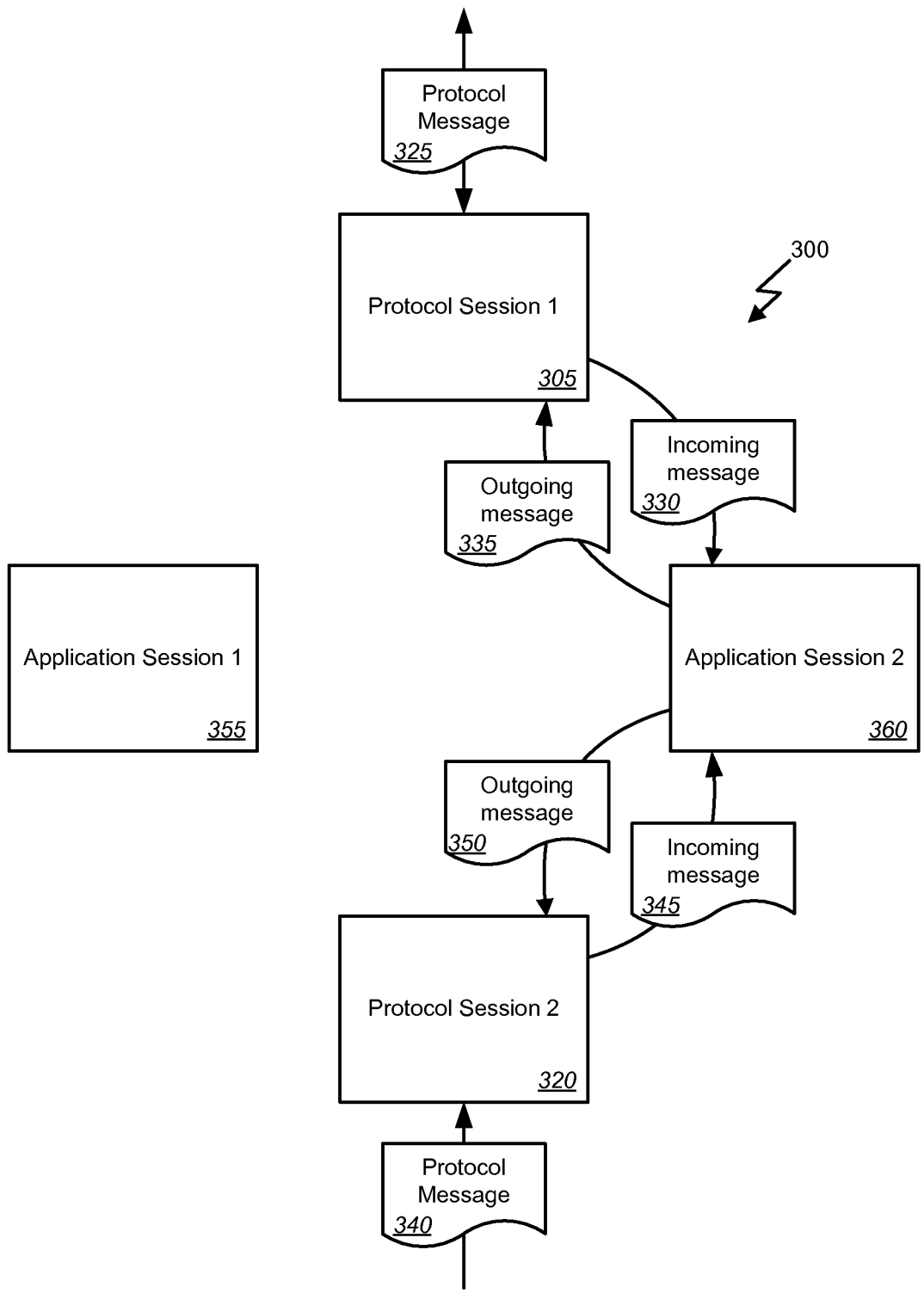

FIGS. 3A-3C are block diagrams conceptually illustrating providing high availability in a session according to one embodiment of the present invention. As known in the art, a system 300 can include one or more processing nodes (not shown here). If more than one, the nodes can be communicatively coupled to one another via the Internet or any other wide area or local area network (not shown here) as described above to form a cluster as known in the art. Such a system 300 may be used, for example, to implement a web service supporting communication sessions between parties using one or more protocols such as Session Initiation Protocol (SIP) and HyperText Transfer Protocol (HTTP). In other examples, any number of different protocols in different combinations can be used.

In the example illustrated in FIGS. 3A-3C, one or more of the nodes or the system 300 can be used to support sessions including but not limited to a first protocol session 305 that can be used to send and receive protocol messages 325 in a first protocol (e.g., HTTP) and a second protocol session 320 that can be used to send and receive protocol messages 340 in a second protocol (e.g., SIP). It should be understood that the protocol messages 325 and 340 can comprise messages of the same or different protocol(s). That is, it should be understood that while described herein with reference to two protocols sessions 305 and 320, embodiments of the present invention are not limited to implementations using two different protocols. Rather, the protocol sessions 305 and 320 may be two sessions of the same protocol. The system 300 can also support a number of application sessions 355 and 360. For example, one application session 355 can comprise a currently active application session interacting with the protocol sessions 305 and 320 while one or more application sessions 360 can comprise replicated sessions. It should be understood that in other implementations, any number of application sessions and/or protocol sessions may be used depending upon load balancing, redundancy, and other considerations. Also, one or more nodes of the system can replicate fully or partially the application session and/or the protocol sessions so that either or both can be recomposed when needed.

According to one embodiment, the first protocol session 305 can be adapted to receive protocol messages 325 of the communication session (e.g., HTTP messages) and perform protocol specific processing of the communications such as receiving, routing, acknowledging and/or respond to the received messages. The first protocol session 305 can provide incoming messages 330 to the first application session 310 and the first application session 310 can provide outgoing messages 335 to the first protocol session 305, based on execution of the application. The incoming and outgoing messages 330 and 335 may be any of a variety of different types and formats of messages. For example, if the protocol session 320 and the application session 355 are implemented on different nodes of the system 300, the incoming messages 330 and the outgoing messages 335 may be exchanged as inter-process communications. In other implementations, the incoming and outgoing messages 330 and 335 may be exchanged as protocol messages, i.e., messages of the protocol of the first protocol session 305.

The second protocol session 320 can be adapted to receive protocol messages 340 of the communication session. In some cases, the second protocol session 320 can receive messages 340 in a second, different protocol (e.g., SIP) and perform protocol specific processing of the communications such as receiving, routing, acknowledging and/or respond to the received messages. The second protocol session 320 can provide incoming messages 345 to the first application session 355 and the first application session 355 can provide outgoing messages 350 to the second protocol session 320 based on execution of the application. The incoming and outgoing messages 345 and 350 may be any of a variety of different types and formats of messages. For example, if the protocol session 320 and the application session 355 are implemented on different nodes of the system 300, the incoming messages 345 and the outgoing messages 350 may be exchanged as inter-process communications. In other implementations, the incoming and outgoing messages 345 and 350 may be exchanged as protocol messages, i.e., messages of the protocol of the second protocol session 320.

As noted above, upon a failure, the corresponding replicated session(s) can be made active so that the communication session can be continued. For example, upon a failure of the first application session 355, the second application session 360 can become the active session and processing can continue as illustrated in FIG. 3B. That is, since the second application session 360 is replicating the first application session 355 or can re-assemble it from somewhere else, it can become the active session upon a failure of the first application session 355. Thus, for example, when a new protocol message 325 is received by the first protocol session 305 the resulting incoming message 330 from the first protocol session 305 can be redirected to the second application session 360 and the second application session 360 can in turn provide outgoing messages 335 to the first protocol session 305 based on execution of the application as illustrated in FIG. 3B. Furthermore, when the second protocol session 320 receives a protocol message 340, it can determine that the second application session 360 is the currently active session and send the resulting incoming message 330 to the second application session 360 which in turn can provide outgoing messages 335 to the first protocol session 305 based on execution of the application as illustrated in FIG. 3C.

As noted above, continuation of the communication session as illustrated in FIGS. 3A-3C can be performed according to any of a number of different models. According to one of these models, incoming messages 350 and 345 can be directed from the protocol sessions 305 and 320 to the active application session. According to one embodiment, when the second application session 360 is implemented on a different node of the system 300 from the protocol sessions 305 and 320, the incoming and outgoing messages 330, 335, 345, and 350 can comprise inter-process communications. Alternatively, the incoming and outgoing messages 330, 335, 345, and 350 can comprise the incoming and outgoing messages 330, 335, 345, and 350 may be exchanged as protocol messages, i.e., messages of the protocol of the protocol sessions 305 and 320.

In another model, rather than redirecting the incoming and outgoing messages 330, 335, 345, and 350, the second application session 360 can be moved to a node supporting one of the protocol sessions 320 or 305. For example, in a system such as Oracle Coherence that supports distributed caches, the second application session 360 can be efficiently moved to a node such as a node supporting the first protocol session 305 or a node supporting the second protocol session 320. In some cases, both protocol sessions 305 and 320 may be supported on the same node.

In yet another model, a hybrid approach can be taken in which either the first model, i.e., redirecting messages to the active session, or the second model, i.e., moving the active session, is selected. In this hybrid model, determining which approach to take can be based, for example, on a relative cost (e.g., in terms of processing or other resource costs) of each. That is, upon failure of the first application session 355, a determination can be made by one of the protocol sessions 305 or 320, by the second application session 360, or by another element of the system 300 as to whether it would be cheaper, more efficient, etc. to redirect communications between the protocol session(s) 305 and 320 and the newly active second application session 360. To do so, protocol sessions 305 and 320 and application sessions 355 and 360 should be allowed to communicate/exchange information. Alternatively, another system (not shown here), e.g., an underlying distributed system, can manage these decisions.

Figure 4A:
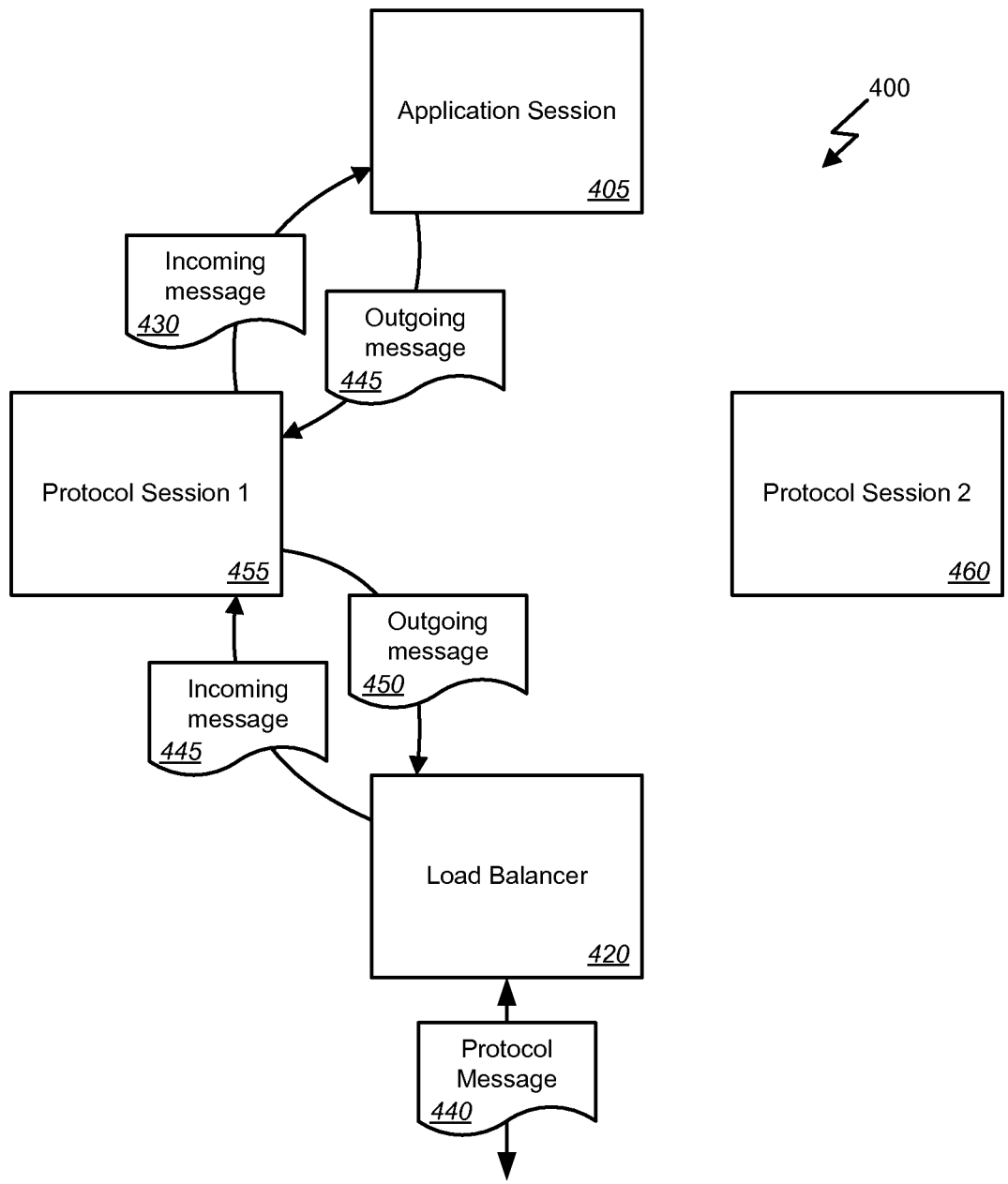
FIGS. 4A-4C are block diagrams conceptually illustrating providing high availability in a session according to another embodiment of the present invention.
Figure 4B:
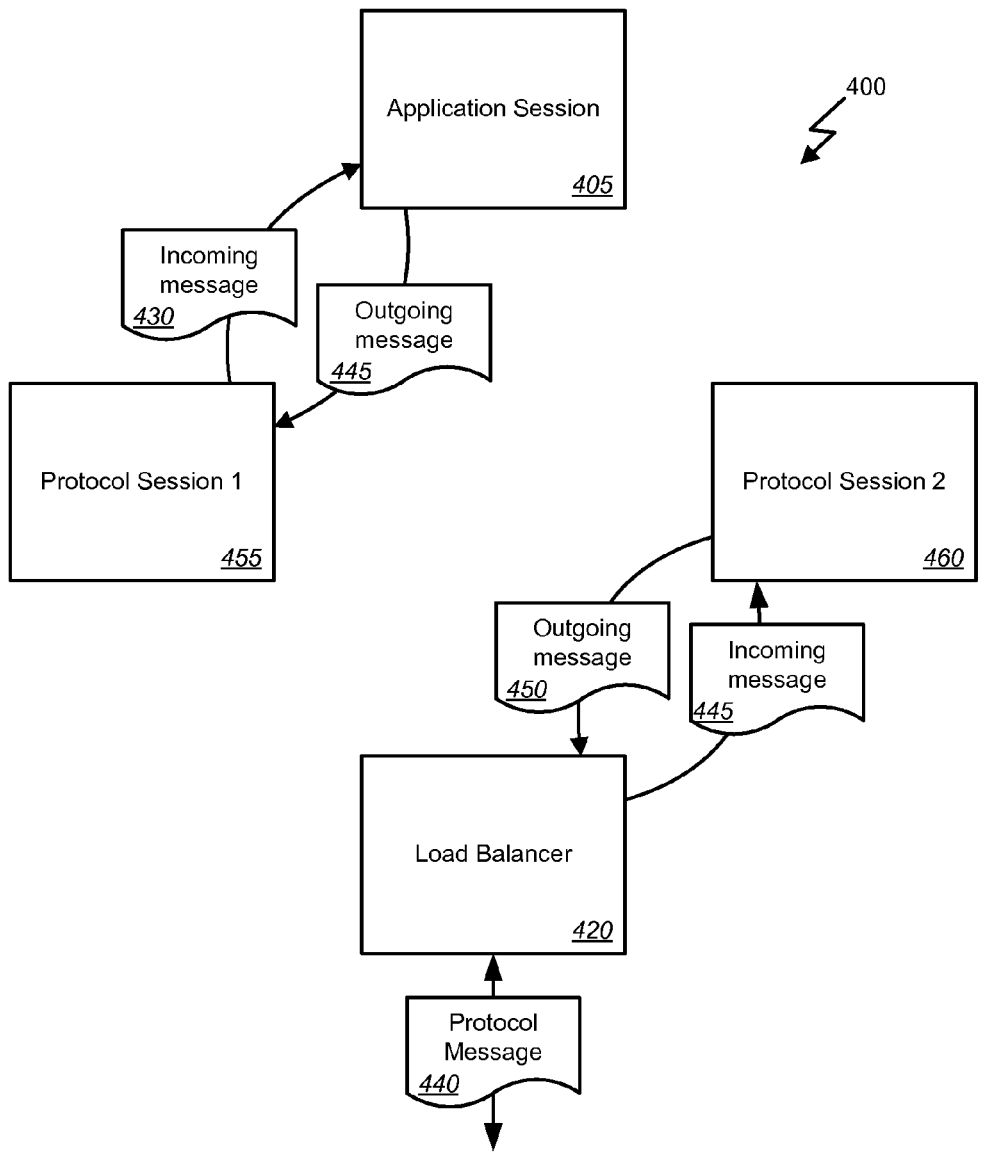
Figure 4C:
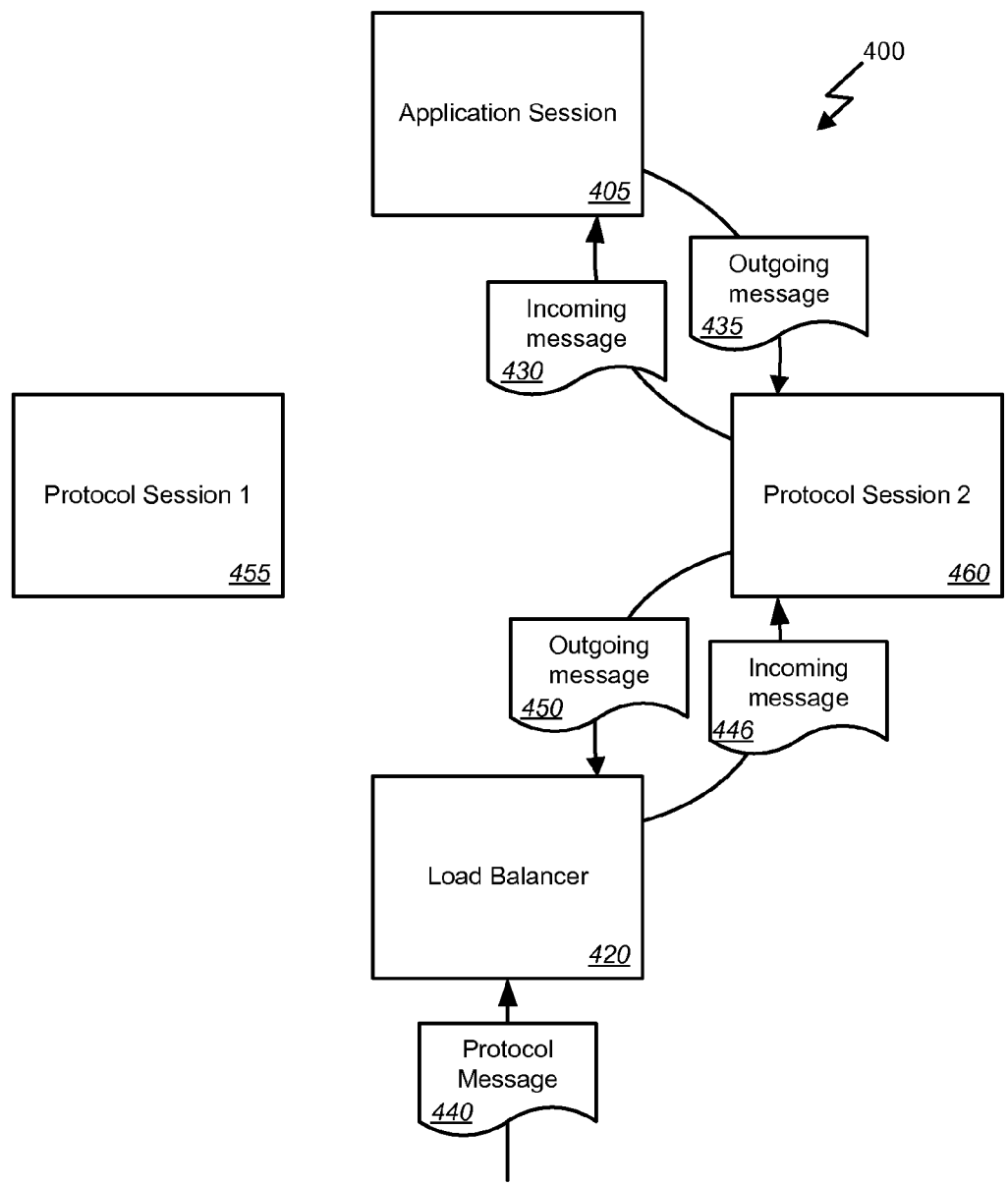

It should be understood that not only the application sessions may be replicated. In some cases, the protocol sessions may additionally or alternatively be replicated and high availability in the communication session can be provided based on that replication as illustrated in FIGS. 4A-4C. In this example, the system 400 comprises an application session 405 and a number of protocol sessions 455 and 460. The system can also include a load balancer 420 or router adapted to receive protocol messages 440 of the communication session and route the incoming protocol messages 445 to the first protocol session 455.

The first protocol session 455 can be adapted to receive the incoming protocol messages 445 from the load balancer 420 or router and perform protocol specific processing of the communications. The first protocol session 455 can provide incoming messages 430 to the application session 405. The application session 405 can provide outgoing messages 445 to the first protocol session 455 based on execution of the application. The incoming and outgoing messages 430 and 445 may be any of a variety of different types and formats of messages. For example, if the protocol session 455 and the application session 405 are implemented on different nodes of the system 400, the incoming messages 430 and the outgoing messages 445 may be exchanged as inter-process communications. In other implementations, the incoming and outgoing messages 430 and 445 may be exchanged as protocol messages, i.e., messages of the protocol of the first protocol session 455.

The second protocol session 460 can be adapted to replicate the first protocol session 455. As noted above, upon a failure, the corresponding replicated session(s) can be made active so that the communication session can be continued. For example, upon a failure of the first protocol session 455, the second protocol session 460 can become the active session and processing can continue as illustrated in FIG. 4B. That is, since the second protocol session 460 is replicating the first protocol session 455 or can re-assemble it from somewhere else, it can become the active session upon a failure of the first protocol session 455. Thus, for example, when a new protocol message 440 is received by the load balancer 420 and the load balancer 420 ha detected a failure of the first protocol session 455 the incoming message 445 can be redirected to the second protocol session 460 and the second protocol session 460 can in turn provide outgoing messages 450 to the load balancer 420 as illustrated in FIG. 4B. Furthermore, when the application session 405 receives an incoming message 430, it can send the resulting outgoing message 435 to the second protocol session 460 in response as illustrated in FIG. 4C.

Again, continuation of the communication session as illustrated in FIGS. 4A-4C can be performed according to any of a number of different models. According to one of these models, incoming messages 445 and 450 can be directed from the load balancer 420 to the active protocol session. In another model, rather than redirecting the incoming and outgoing messages 445 and 450, the second protocol session 460 can be moved, for example, to a node supporting the load balancer 420 or the application session 405. In yet another model, a hybrid approach can be taken in which either the first model, i.e., redirecting messages to the active session, or the second model, i.e., moving the active session, is selected. In this hybrid model, determining which approach to take can be based, for example, on a relative cost (e.g., in terms of processing or other resource costs) of each.

It should be understood that any number of sessions and any number of processing nodes to support those sessions may be implemented without departing from the scope of the present invention. Furthermore, it should be understood that replication and high availability handling of the application session as described above with reference to FIGS. 3A-3C need not be implemented exclusively or separate from the replication and high availability handling of the protocol session as described above with reference to FIGS. 4A-4C. Rather, such replication and high availability processing may be performed together.

Figure 5:
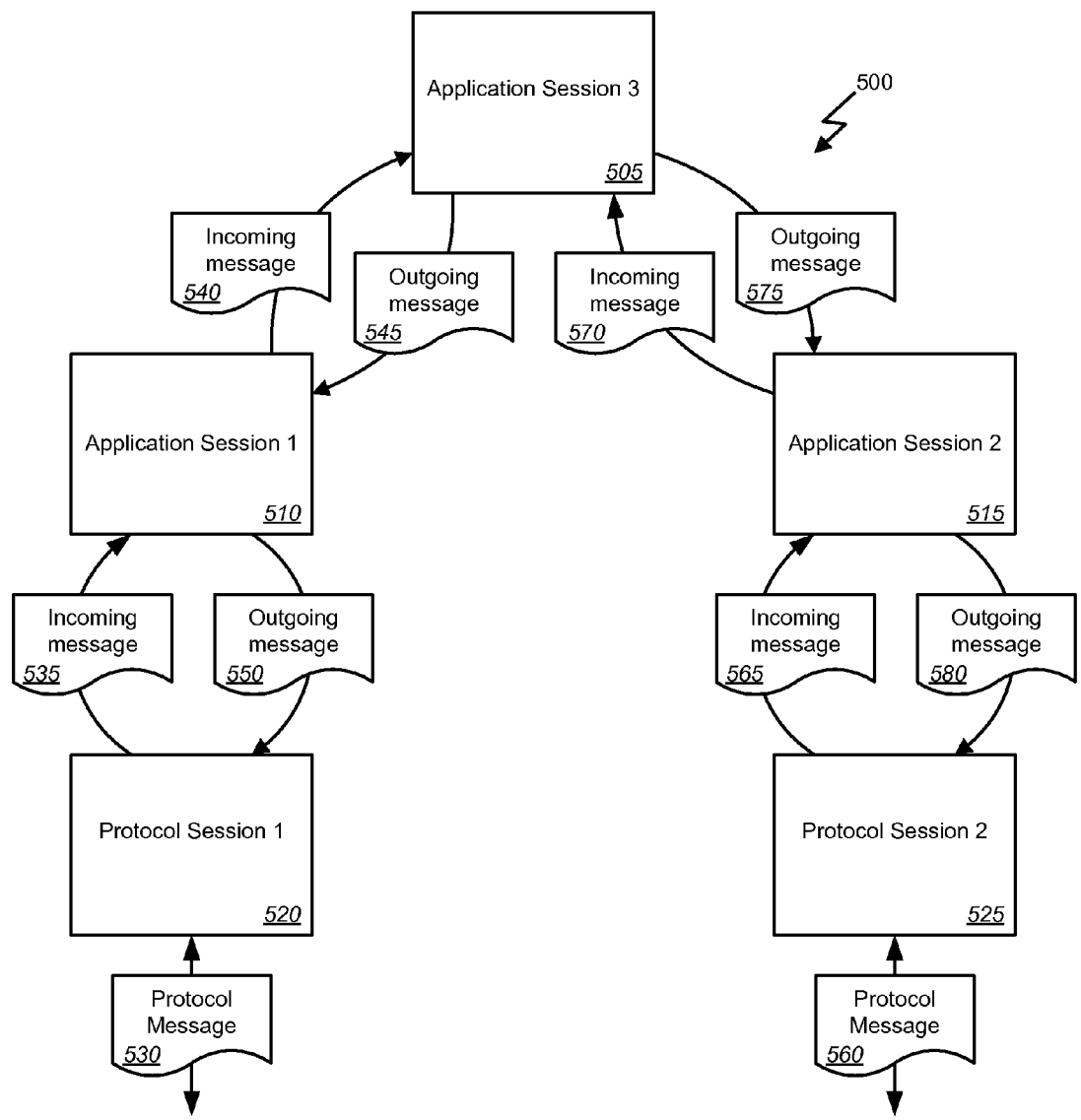
FIG. 5 is a block diagram conceptually illustrating providing high availability in a session according to yet another embodiment of the present invention.

FIG. 5 is a block diagram conceptually illustrating providing high availability in a session according to yet another embodiment of the present invention. In this example, the system 500 includes a number of protocol sessions 520 and 525 adapted to send and receive protocol messages 530 and 560 and perform protocol specific processing as described above. The system also includes a number of application sessions 510 and 515 adapted to receive incoming messages 535 and 565 from the protocol sessions 520 and 525, perform processing specific to the portion of the communication session supported by the respective protocol session 530 and 525 and return outgoing messages 550 and 580 accordingly. Furthermore, the system 500 can include an application session 505 adapted to receive incoming messages 540 and 570 from each of the other application sessions 510 and 515 performing processing specific to the portion of the communication session supported by the respective protocol session 530 and 525. This application session 505 can in turn perform processing for the communication session not specific to either of the protocol sessions 520 or 525 such as performing floor control etc and return outgoing messages 545 and 575 to the other application sessions 510 and 515 accordingly.

Each and/or all of these elements may be replicated on one or more other sessions (not shown here) on any number of one or more nodes of the system 500. Thus, upon a failure of one of the protocol sessions 520 or 525, another protocol session (not shown here) can become active and support the communication session as described above with reference to FIGS. 4A-4C. Similarly, upon a failure of one of the application sessions 505-515, another application session (not shown here) can become active and support the communication session as described above with reference to FIGS. 3A-3C. In each of these cases, one of the various models described herein can be utilized to continue the communication session. That is, the incoming and outgoing messages can be redirected to the newly active session, the newly active session can be moved to another node supporting another portion of the communication session, or determination of the relative cost of each approach can be made and the model selected accordingly.

Figure 6:
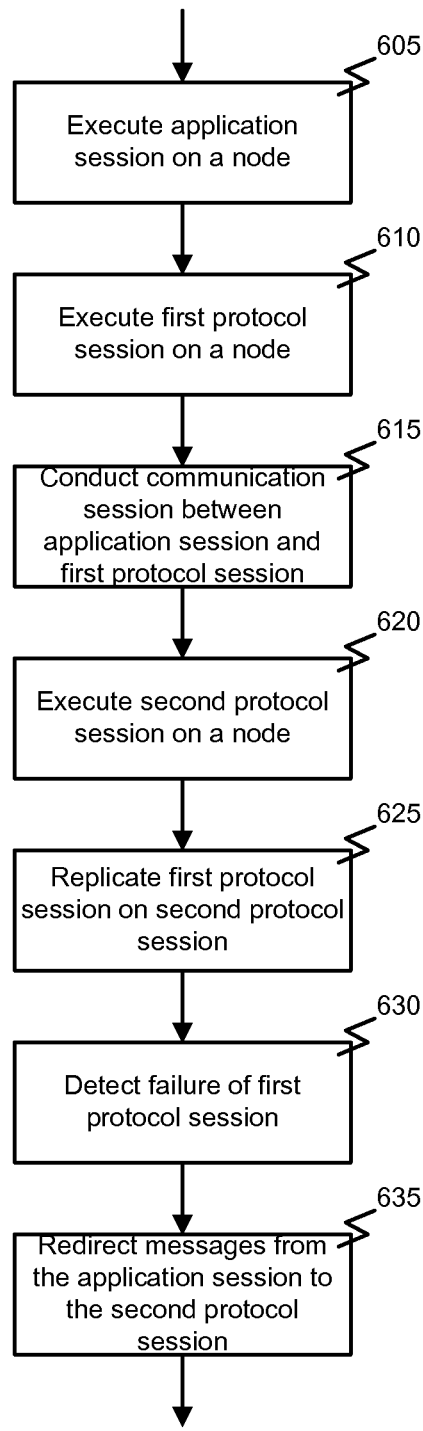
FIG. 6 is a flowchart illustrating an example of a process for handling a failure of a replicated session according to one embodiment of the present invention.

FIG. 6 is a flowchart illustrating an example of a process for handling a failure of a replicated session according to one embodiment of the present invention. More specifically, this example represents an implementation of the first model described above, i.e., responding to a failure in a replicated session by redirecting messages to/from the failed session. In this example, the process can begin with executing 605 a first application session on at least one processing node and executing 610 a first protocol session on the at least one processing node. As noted above, the first protocol session can perform protocol processing specific to a supporting communications protocol and the application session can perform processing of the communication session other than protocol processing and wherein the first protocol session is de-coupled from the first application session. The communication session can be conducted 615 between the first application session and first protocol session. Thus, incoming messages can be provided to the first application session from the first protocol session based on the protocol processing and outgoing messages to the first protocol session can be provided from the first application session based on the processing of the communication session.

A second protocol session can be executed 620 on the at least one processing node, the second protocol session replicating the first protocol session. Upon detecting 630 a failure of the first protocol session, the communication session can be continued with the first application session and the second protocol session. Specifically, continuing the communication session can comprise redirecting 635 the outgoing messages from the first application session to the second protocol session.

Figure 7:
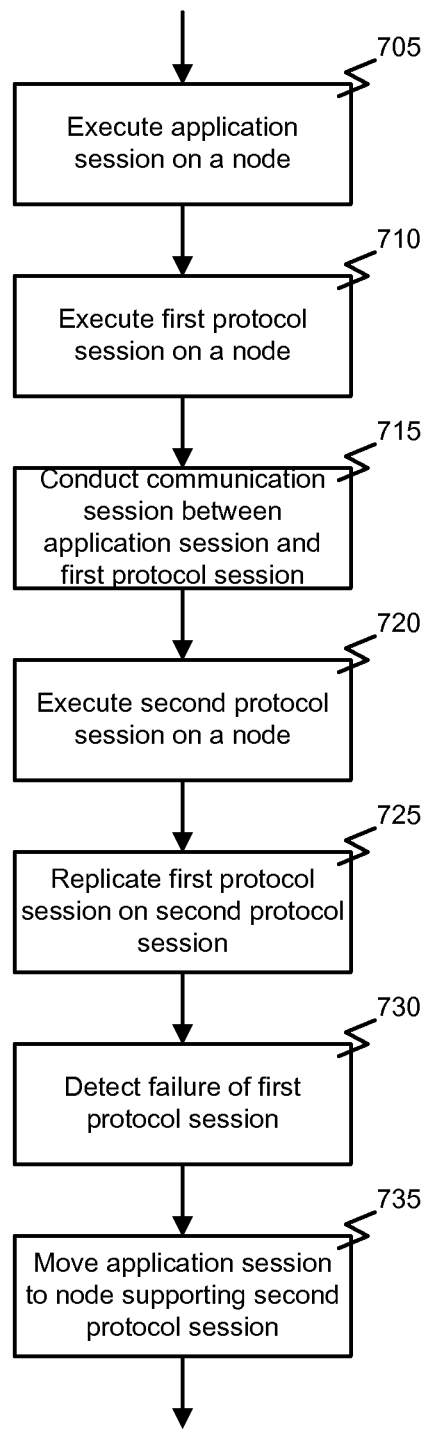
FIG. 7 is a flowchart illustrating an example of an alternative process for handling a failure of a replicated session according to another embodiment of the present invention.

FIG. 7 is a flowchart illustrating an example of an alternative process for handling a failure of a replicated session according to another embodiment of the present invention. More specifically, this example represents an implementation of the second model described above, i.e., responding to a failure in a replicated session by moving an active session to another node. In this example, the process can begin with executing 705 a first application session on at least one processing node and executing 710 a first protocol session on the at least one processing node. As noted above, the first protocol session can perform protocol processing specific to a supporting communications protocol and the application session can perform processing of the communication session other than protocol processing and wherein the first protocol session is de-coupled from the first application session. The communication session can be conducted 715 between the first application session and first protocol session. Thus, incoming messages can be provided to the first application session from the first protocol session based on the protocol processing and outgoing messages to the first protocol session can be provided from the first application session based on the processing of the communication session.

A second protocol session can be executed 720 on the at least one processing node, the second protocol session replicating the first protocol session. Upon detecting 730 a failure of the first protocol session, the communication session can be continued with the first application session and the second protocol session. Specifically, continuing the communication session can comprise moving 735 the first application session to a node of the at least one processing node on which the second protocol session is executing.

Figure 8:
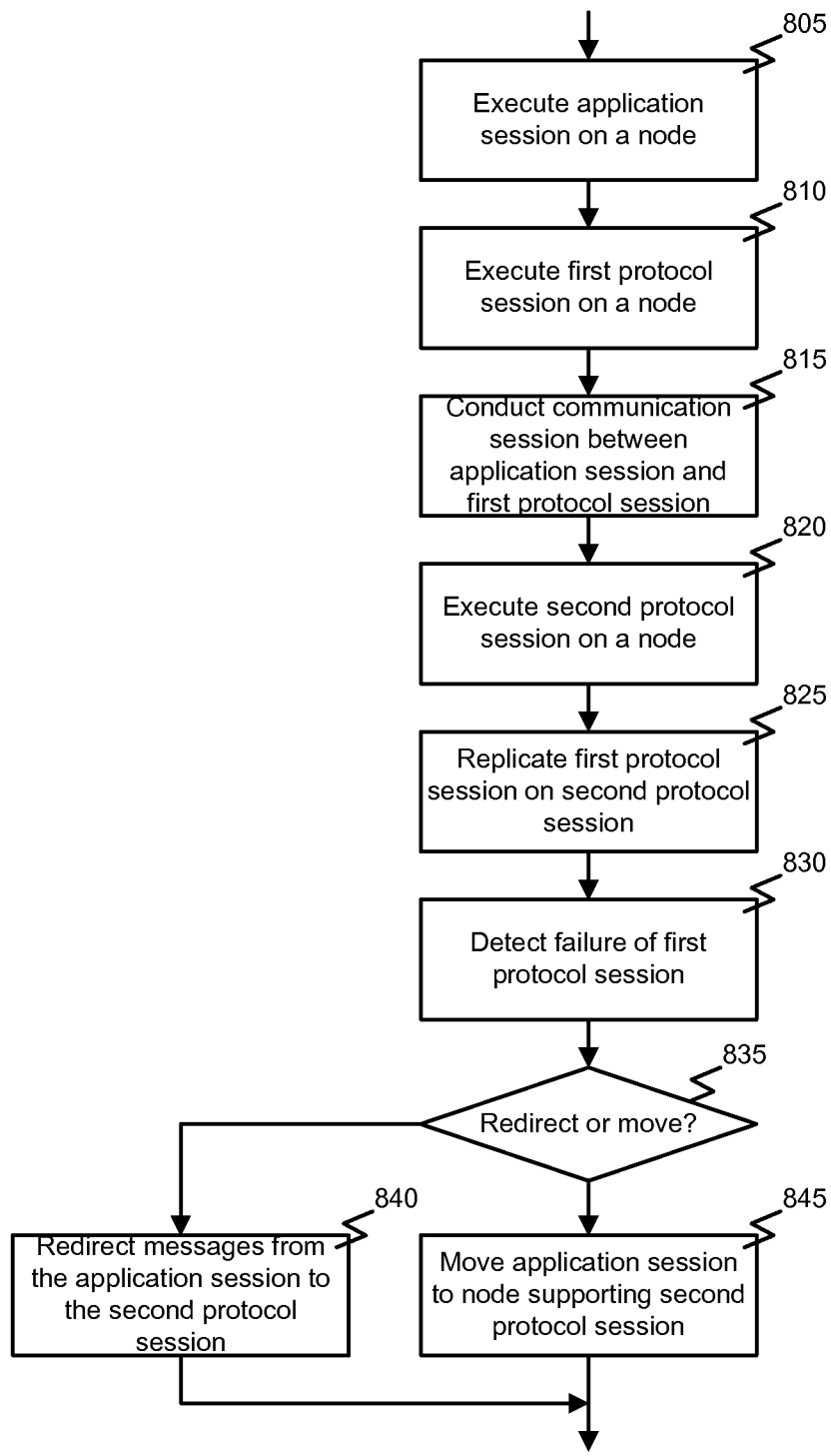
FIG. 8 is a flowchart illustrating an example of another alternative process for handling a failure of a replicated session according to another embodiment of the present invention.

FIG. 8 is a flowchart illustrating an example of another alternative process for handling a failure of a replicated session according to another embodiment of the present invention. More specifically, this example represents an implementation of the third model described above, i.e., responding to a failure in a replicated session based on a relative cost of either redirecting messages or moving an active session to another node. In this example, the process can begin with executing 805 a first application session on at least one processing node and executing 810 a first protocol session on the at least one processing node. As noted above, the first protocol session can perform protocol processing specific to a supporting communications protocol and the application session can perform processing of the communication session other than protocol processing and wherein the first protocol session is de-coupled from the first application session. The communication session can be conducted 815 between the first application session and first protocol session. Thus, incoming messages can be provided to the first application session from the first protocol session based on the protocol processing and outgoing messages to the first protocol session can be provided from the first application session based on the processing of the communication session.

A second protocol session can be executed 820 on the at least one processing node, the second protocol session replicating the first protocol session. Upon detecting 830 a failure of the first protocol session, the communication session can be continued with the first application session and the second protocol session. Specifically, continuing the communication session can comprise determining 835 a relative cost of redirecting the incoming and outgoing messages and moving the first application session to another node of the at least one processing node and either redirecting 840 the outgoing messages from the first application session to the second protocol session or moving 845 the first application session to the node on which the second protocol session is executed based on the relative costs. For example, the relative costs can be determined based on one or more of delays, bandwidth, and processing.

It should be noted that, while described in FIGS. 6-8 with reference to a replicated protocol session, the application session may additionally or alternatively be replicated and, as described above, failures in the application session can be handled according to the same approaches as will be described below with reference to FIGS. 9-11. So for example, a second application session can be executed on the at least one processing node. The first application session can be replicated in the second application session. Upon a failure of the first application session, the second application session can be made an active session. For example, incoming messages from the first protocol session can be redirected to the second application session. Alternatively, the second application session can be moved to a node of the at least on nodes on which the first protocol session is executing. In yet another alternative, a relative cost of redirecting the incoming and outgoing messages and moving the second application session to a node on which the first protocol session is executed can be determined and either the incoming and outgoing messages can be redirected to the second application session or the second application session can be moved to the node on which the first protocol session is executed based on the relative costs. For example, the relative costs can be determined based on one or more of delays, bandwidth, and processing. Additionally, it should be understood that, when moving an active session to another node, either a protocol session or an application session may be moved. Which session to move can be determined, for example, based on application logic, a pre-configuration, and/or other dynamic and/or pre-determined factors. For example, traffic and node usage at a given point may be used to determine which session is moved.

Figure 9:
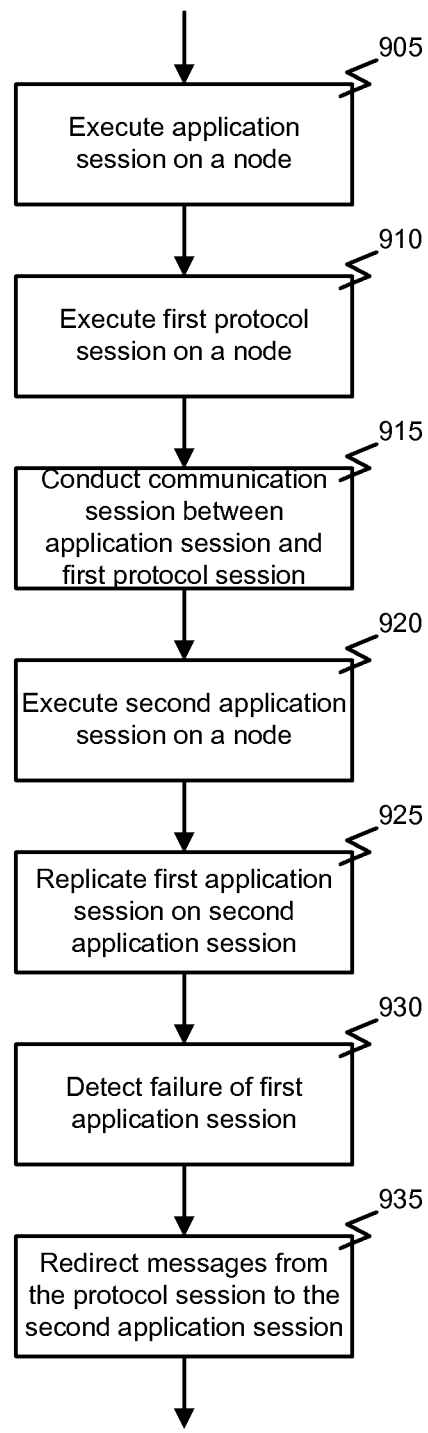
FIG. 9 is a flowchart illustrating an example of a process for handling a failure of a replicated session according to one embodiment of the present invention.

FIG. 9 is a flowchart illustrating an example of a process for handling a failure of a replicated session according to one embodiment of the present invention. More specifically, this example represents an implementation of the first model described above, i.e., responding to a failure in a replicated session by redirecting messages to/from the failed session. In this example, the process can begin with executing 905 a first application session on at least one processing node and executing 910 a first protocol session on the at least one processing node. As noted above, the first protocol session can perform protocol processing specific to a supporting communications protocol and the application session can perform processing of the communication session other than protocol processing and wherein the first protocol session is de-coupled from the first application session. The communication session can be conducted 915 between the first application session and first protocol session. Thus, incoming messages can be provided to the first application session from the first protocol session based on the protocol processing and outgoing messages to the first protocol session can be provided from the first application session based on the processing of the communication session.

A second application session can be executed 920 on the at least one processing node, the second application session replicating the first application session. Upon detecting 930 a failure of the first application session, the communication session can be continued with the first protocol session and the second application session. Specifically, continuing the communication session can comprise redirecting 935 the outgoing messages from the first protocol session to the second application session.

Figure 10:
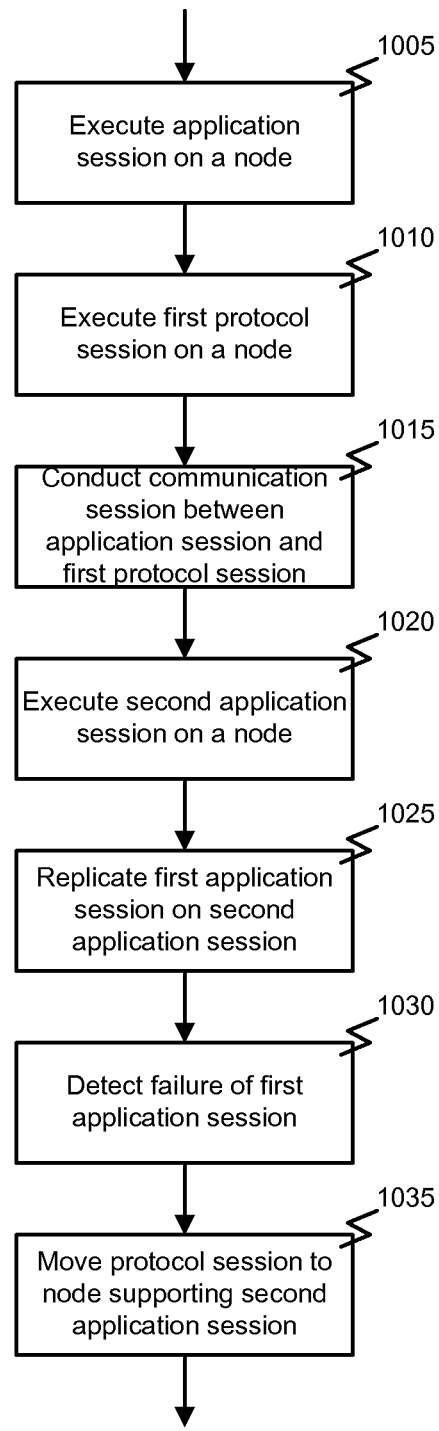
FIG. 10 is a flowchart illustrating an example of an alternative process for handling a failure of a replicated session according to another embodiment of the present invention.

FIG. 10 is a flowchart illustrating an example of an alternative process for handling a failure of a replicated session according to another embodiment of the present invention. More specifically, this example represents an implementation of the second model described above, i.e., responding to a failure in a replicated session by moving an active session to another node. In this example, the process can begin with executing 1005 a first application session on at least one processing node and executing 1010 a first protocol session on the at least one processing node. As noted above, the first protocol session can perform protocol processing specific to a supporting communications protocol and the application session can perform processing of the communication session other than protocol processing and wherein the first protocol session is de-coupled from the first application session. The communication session can be conducted 1015 between the first application session and first protocol session. Thus, incoming messages can be provided to the first application session from the first protocol session based on the protocol processing and outgoing messages to the first protocol session can be provided from the first application session based on the processing of the communication session.

A second application session can be executed 1020 on the at least one processing node, the second application session replicating the first application session. Upon detecting 1030 a failure of the first application session, the communication session can be continued with the first protocol session and the second application session. Specifically, continuing the communication session can comprise moving 1035 the first protocol session to a node of the at least one processing node on which the second application session is executing.

Figure 11:
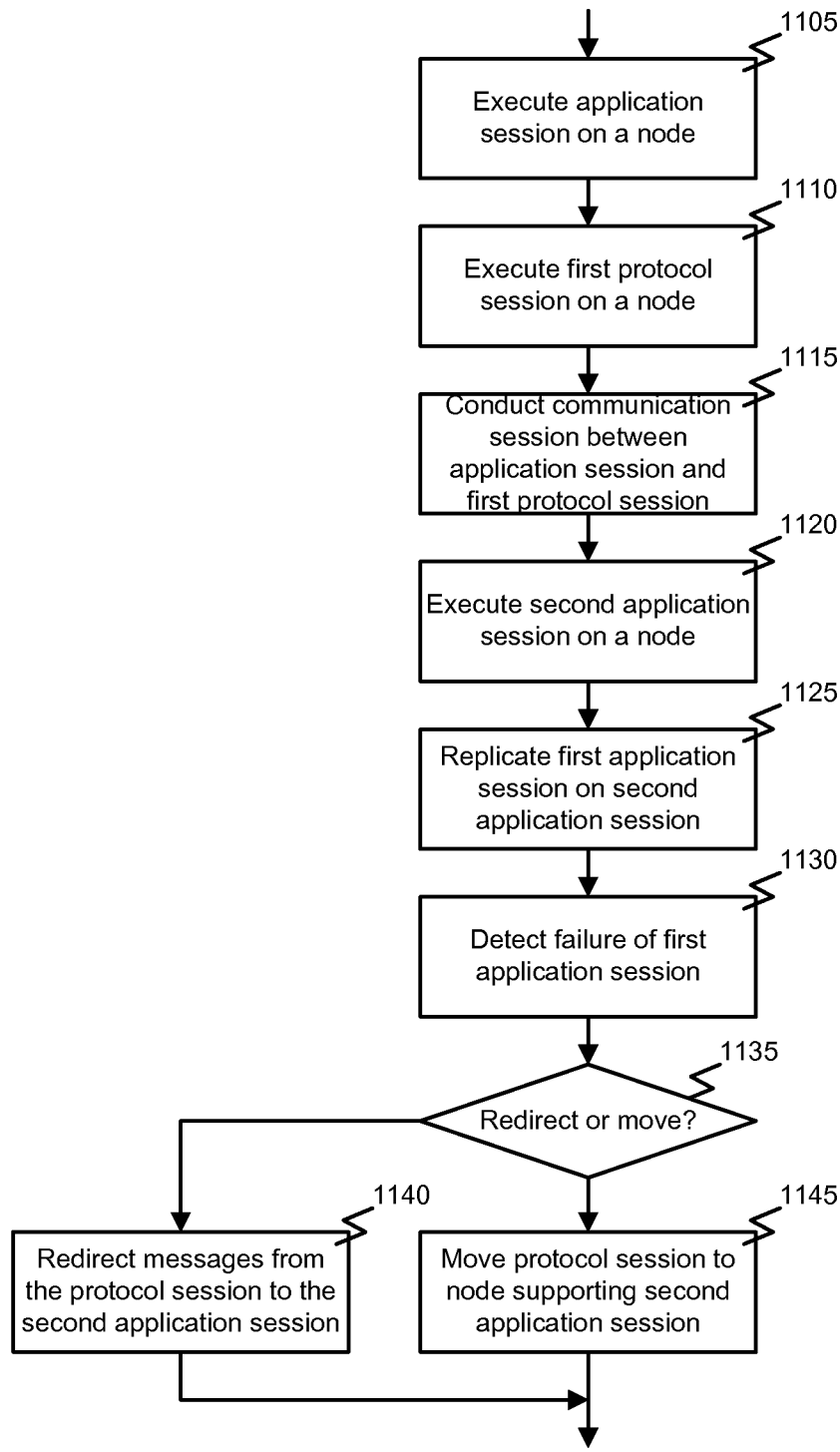
FIG. 11 is a flowchart illustrating an example of another alternative process for handling a failure of a replicated session according to another embodiment of the present invention.

FIG. 11 is a flowchart illustrating an example of another alternative process for handling a failure of a replicated session according to another embodiment of the present invention. More specifically, this example represents an implementation of the third model described above, i.e., responding to a failure in a replicated session based on a relative cost of either redirecting messages or moving an active session to another node. In this example, the process can begin with executing 1105 a first application session on at least one processing node and executing 1110 a first protocol session on the at least one processing node. As noted above, the first protocol session can perform protocol processing specific to a supporting communications protocol and the application session can perform processing of the communication session other than protocol processing and wherein the first protocol session is de-coupled from the first application session. The communication session can be conducted 1115 between the first application session and first protocol session. Thus, incoming messages can be provided to the first application session from the first protocol session based on the protocol processing and outgoing messages to the first protocol session can be provided from the first application session based on the processing of the communication session.

A second application session can be executed 1120 on the at least one processing node, the second application session replicating the first application session. Upon detecting 1130 a failure of the first application session, the communication session can be continued with the first protocol session and the second application session. Specifically, continuing the communication session can comprise determining 1135 a relative cost of redirecting the incoming and outgoing messages and moving the first protocol session to another node of the at least one processing node and either redirecting 1140 the outgoing messages from the first protocol session to the second application session or moving 1145 the first protocol session to the node on which the second application session is executed based on the relative costs. For example, the relative costs can be determined based on one or more of delays, bandwidth, and processing.

Thus, upon a failure of a replicated application session or protocol session, the corresponding replicated sessions can be made active. The communication session can then be continued according to a number of different models described herein. For example, in a first model, messages to the failed session, either a failed protocol session or application session can be redirected to the currently active session. In a second model, the currently active session can be moved to another node, e.g., an active application session can be moved to a node supporting a corresponding protocol session. In yet another model, a hybrid approach can be taken in which either the first model, i.e., redirecting messages to the active session, or the second model, i.e., moving the active session, is selected. In this hybrid model, determining which approach to take can be based, for example, on a relative cost (e.g., in terms of processing or other resource costs) of each. Additionally, it should be understood that, when moving an active session to another node, either a protocol session or an application session may be moved. Which session to move can be determined, for example, based on application logic, a pre-configuration, and/or other dynamic and/or pre-determined factors. For example, traffic and node usage at a given point may be used to determine which session is moved.

Figure 12:
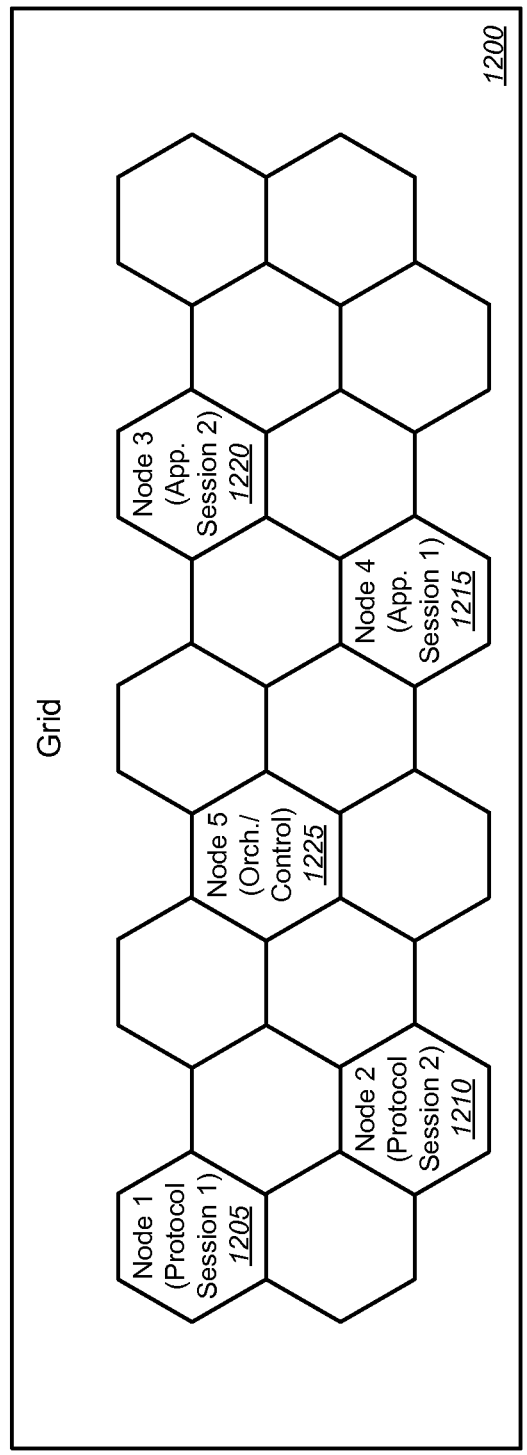
FIG. 12 is a block diagram illustrating a clustered system in which embodiments of the present invention may be implemented.

FIG. 12 is a block diagram illustrating a clustered system in which embodiments of the present invention may be implemented. This example includes a grid 1200 computing system such as, for example, an Oracle Coherence grid, executing a first application session on at least one processing node 1215. The grid 1200 can also execute a first protocol session on at least one processing node 1205. A second protocol session can be executed on at least on processing node 1210. In such cases, the second protocol session can be a replication of the first protocol session. Additionally or alternatively, the grid 1200 can execute a second application session on at least one processing node 1220 replicating the first application session. Upon a failure of one of the sessions, the corresponding replicated sessions can be made active. For example, in a first model, messages to the failed session, either a failed protocol session or application session can be redirected to the currently active session on the node upon which it is executing. In a second model, the currently active session can be moved to another node, e.g., an active application session can be moved to a node supporting a corresponding protocol session. In yet another model, a hybrid approach can be taken in which either the first model, i.e., redirecting messages to the active session, or the second model, i.e., moving the active session, is selected. In this hybrid model, determining which approach to take can be based, for example, on a relative cost (e.g., in terms of processing or other resource costs) of each.

So for example, assuming a communication session between the first protocol session on one node 1205 and the first application session on another node 1215, incoming messages can be provided to the node 1215 executing the first application session from the node 1205 executing the first protocol session based on the protocol processing. Similarly, outgoing messages can be provided to the node 1205 executing the first protocol session from the node 1215 executing the first application session based on the processing of the communication session. Upon detecting a failure of the first protocol session, the communication session can be continued with the first application session and the second protocol session. Similarly, upon detecting a failure of the first application session, the communication session can be continued with the first protocol session and the second application session.

More specifically, continuing the communication session upon a failure of the first protocol session on node 1205 according to the first model can comprise redirecting the messages to or from the first application session on node 1215 to or from the second protocol session on node 1210. Under the second model, when the first protocol session on node 1205 fails, either the first application session on node 1215 can be moved to node 1210 on which the second protocol session is executing or the second protocol session executing on node 1210 can be moved to node 1215 upon which the first application session is executing. Which session to move can be determined, for example, by the individual sessions or by another application such as an orchestrator or other application executing on another node 1215 based on a pre-configuration or dynamic considerations such as relative loads of the nodes 1210 and 1215 etc. Under the third model, a relative cost of redirecting the incoming and outgoing messages and moving the sessions to another node can be compared by the sessions or by another application such as an orchestrator or other application executing on another node 1215. Then, either the messages between nodes 1205 and 1215 can be redirected to or from node 1210 or an active session, either the second protocol session or the first application session can be moved to either node 1215 or 1210 respectively based on the relative costs. As noted above, when moving an active session to another node, either a protocol session or an application session may be moved. Which session to move can be determined, for example, based on application logic executing one of the nodes 1210 and 1215 or another node 1225, a pre-configuration, and/or other dynamic and/or pre-determined factors. For example, traffic and node usage at a given point may be used to determine which session is moved.

In another example, continuing the communication session upon a failure of the first application session on node 1215 according to the first model can comprise making the second application session on node 1220 the active session. Furthermore, under the first model messages to or from the first protocol session on node 1205 can be redirected to or from the second application session on node 1220. Under the second model, when the first application session on node 1215 fails, either the second application session on node 1220 can be moved to node 1205 on which the first protocol session is executing or the first protocol session executing on node 1205 can be moved to node 1220 upon which the second application session is executing. Which session to move can be determined, for example, by the individual sessions or by another application such as an orchestrator or other application executing on another node 1215 based on a pre-configuration or dynamic considerations such as relative loads of the nodes 1205 and 1220 etc. Under the third model, a relative cost of redirecting the incoming and outgoing messages between nodes and moving the sessions can be determined by the sessions or by another application such as an orchestrator or other application executing on another node 1215. Then, either the messages between nodes 1205 and 1215 can be redirected to or from node 1220 or an active session, either the second application session or the first protocol session can be moved to either node 1205 or 1220 respectively based on the relative costs. As noted above, when moving an active session to another node, either a protocol session or an application session may be moved. Which session to move can be determined, for example, based on application logic, a pre-configuration, and/or other dynamic and/or pre-determined factors. For example, traffic and node usage at a given point may be used to determine which session is moved.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of providing high availability in a communication session, the method comprising:
    executing a first application session on at least one processing node;
    executing a first protocol session on the at least one processing node in a first communication protocol, wherein the first protocol session performs protocol processing specific to a supporting communications protocol and the application session performs processing of the communication session other than protocol processing and wherein the first protocol session is de-coupled from the first application session;
    executing a second protocol session on the at least one processing node in a second communication protocol, the second protocol session replicating the first protocol session and wherein the first communication protocol and the second communication protocol are different; and
    upon detecting a failure of the first protocol session, continuing the communication session with the first application session and the second protocol session.

2. The method of claim 1, further comprising providing incoming messages to the first application session from the first protocol session based on the protocol processing and providing outgoing messages to the first protocol session from the first application session based on the processing of the communication session.

3. The method of claim 2, wherein continuing the communication session comprises redirecting the outgoing messages from the first application session to the second protocol session.

4. The method of claim 2, wherein continuing the communication session comprises moving the first application session to a node of the at least one processing node on which the second protocol session is executing.

5. The method of claim 2, wherein continuing the communication session comprises determining a relative cost of redirecting the incoming and outgoing messages and moving the first application session to another node of the at least one processing node and either the outgoing messages from the first application session to the second protocol session or moving the first application session to the node on which the second protocol session is executed based on the relative costs.

6. The method of claim 5, wherein the relative costs are determined based on one or more of delays, bandwidth, and processing.

7. The method of claim 2, further comprising executing a second application session on the at least one processing node and replicating the first application session in the second application session.

8. The method of claim 7, further comprising, upon a failure of the first application session, making the second application session an active session.

9. The method of claim 8, further comprising redirecting the incoming messages from the first protocol session to the second application session.

10. The method of claim 8, further comprising moving the second application session to a node of the at least on nodes on which the first protocol session is executing.

11. The method of claim 8, further comprising determining a relative cost of redirecting the incoming and outgoing messages and moving the second application session to a node on which the first protocol session is executed and either redirecting the incoming and outgoing messages to the second application session or moving the second application session to the node on which the first protocol session is executed based on the relative costs.

12. The method of claim 11, wherein the relative costs are determined based on one or more of delays, bandwidth, and processing.

13. The method of claim 1, wherein the first communication protocol comprises HyperText Transfer Protocol (HTTP) and the second communication protocol comprises Session Initiation Protocol (SIP).

14. A system comprising:
    at least one processor; and
    a memory having stored therein a series of instructions which, when executed by the at least one processor, causes the at least one processor to provide high availability in a communication session by executing a first application session on at least one processing node, executing a first protocol session on the at least one processing node in a first communication protocol, executing a second protocol session on the at least one processing node in a second communication protocol, the second protocol session replicating the first protocol session, wherein the first communication protocol and the second communication protocol are different, wherein the first protocol session performs protocol processing specific to a supporting communications protocol and the application session performs processing of the communication session other than protocol processing and wherein the first protocol session is de-coupled from the first application session, and upon detecting a failure of the first protocol session, continuing the communication session with the first application session and the second protocol session.

15. The system of claim 14, further comprising providing incoming messages to the first application session from the first protocol session based on the protocol processing and providing outgoing messages to the first protocol session from the first application session based on the processing of the communication session.

16. The system of claim 15, wherein continuing the communication session comprises redirecting the outgoing messages from the first application session to the second protocol session, moving the first application session to a node of the at least one processing node on which the second protocol session is executing, or determining a relative cost of redirecting the incoming and outgoing messages and moving the first application session to another node of the at least one processing node and either the outgoing messages from the first application session to the second protocol session or moving the first application session to the node on which the second protocol session is executed based on the relative costs, wherein the relative costs are determined based on one or more of delays, bandwidth, and processing.

17. The system of claim 14, further comprising executing a second application session on the at least one processing node, replicating the first application session in the second application session, and upon a failure of the first application session, making the second application session an active session.

18. The system of claim 17, wherein making the second application session the active session comprises redirecting the incoming messages from the first protocol session to the second application session, moving the second application session to a node of the at least on nodes on which the first protocol session is executing, or determining a relative cost of redirecting the incoming and outgoing messages and moving the second application session to a node on which the first protocol session is executed and either redirecting the incoming and outgoing messages to the second application session or moving the second application session to the node on which the first protocol session is executed based on the relative costs, wherein the relative costs are determined based on one or more of delays, bandwidth, and processing.

19. The system of claim 14, wherein the first communication protocol comprises Session Initiation Protocol (SIP) and the second communication protocol comprises HyperText Transfer Protocol (HTTP).

20. A computer-readable memory storing a set of instructions which, when executed by a processor, cause the processor to provide high availability in a communication session by:
    executing a first application session on at least one processing node;
    executing a first protocol session on the at least one processing node in a first communication protocol, wherein the first protocol session performs protocol processing specific to a supporting communications protocol and the application session performs processing of the communication session other than protocol processing and wherein the first protocol session is de-coupled from the first application session;
    executing a second protocol session on the at least one processing node in a second communication protocol, the second protocol session replicating the first protocol session and wherein the first communication protocol and the second communication protocol are different; and
    upon detecting a failure of the first protocol session, continuing the communication session with the first application session and the second protocol session.

21. The computer-readable memory of claim 20, wherein the first communication protocol comprises HyperText Transfer Protocol (HTTP) and the second communication protocol comprises Session Initiation Protocol (SIP).

* * * * *

UNITED STATES PATENT AND TRADEMARK OFFICE
CERTIFICATE OF CORRECTION

| | | |
|---|---|---|
| PATENT NO. | : 8,688,816 B2 | Page 1 of 1 |
| APPLICATION NO. | : 12/948063 | |
| DATED | : April 1, 2014 | |
| INVENTOR(S) | : Maes et al. | |

It is certified that error appears in the above-identified patent and that said Letters Patent is hereby corrected as shown below:

On Title Page 2, column 2, under Other Publications, line 2, delete "Globecon" and insert
    -- Globecom --, therefor.

Signed and Sealed this
Thirtieth Day of September, 2014

Michelle K. Lee
*Deputy Director of the United States Patent and Trademark Office*